United States Patent
Huang

(10) Patent No.: US 8,000,468 B2
(45) Date of Patent: Aug. 16, 2011

(54) METHOD AND SYSTEM FOR SECURE DATA AGGREGATION IN WIRELESS SENSOR NETWORKS

(75) Inventor: Shih-I Huang, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 908 days.

(21) Appl. No.: 11/987,529

(22) Filed: Nov. 30, 2007

(65) Prior Publication Data

US 2009/0141898 A1    Jun. 4, 2009

(51) Int. Cl.
*H04L 9/00* (2006.01)
(52) U.S. Cl. .......................................................... 380/28
(58) Field of Classification Search .................. 380/28, 380/255
See application file for complete search history.

(56) References Cited

U.S. PATENT DOCUMENTS

| | | | |
|---|---|---|---|
| 6,509,871 | B2 | 1/2003 | Bevington |
| 6,735,630 | B1 | 5/2004 | Gelvin et al. |
| 6,826,607 | B1 | 11/2004 | Gelvin et al. |
| 6,832,251 | B1 | 12/2004 | Gelvin et al. |
| 6,859,831 | B1 | 2/2005 | Gelvin et al. |
| 6,961,728 | B2 | 11/2005 | Wynblatt et al. |
| 7,020,701 | B1 | 3/2006 | Gelvin et al. |
| 7,035,240 | B1 | 4/2006 | Balakrishnan et al. |
| 2007/0171050 | A1* | 7/2007 | Westhoff et al. ......... 340/539.22 |

* cited by examiner

*Primary Examiner* — Brandon S Hoffman
(74) *Attorney, Agent, or Firm* — Finnegan, Henderson, Farabow, Garrett & Dunner, LLP

(57) ABSTRACT

A method for transmitting sensed data in a wireless sensor network including multiple sensors and a database, the method includes: automatically dividing the multiple sensors into sensor groups, each of the sensor groups including at least one sensor; determining a lead sensor in each of the sensor groups; encrypting the sensed data to generate encrypted data in ones of the multiple sensors excluding the determined lead sensors; and transmitting the encrypted data.

22 Claims, 12 Drawing Sheets

230

| Role | Pre-Installed or Obtained Elements |
|---|---|
| Sensor (Excluding Lead Sensor) | $g$, $K_i^{EK}(0)$, and $K_i^{VK}$ |
| Lead Sensor | $g$ and $K_a^{VK} \oplus K_b^{VK} \ \forall \ a \neq b$ |
| Remote Database | $g$ and $K_i^{VK} \ \forall \ i$ |

Fig. 2C

METHOD AND SYSTEM FOR SECURE DATA AGGREGATION IN WIRELESS SENSOR NETWORKS

FIELD OF THE INVENTION

This invention pertains in general to methods and systems for data transmission in sensor networks and, more particularly, to methods and systems for aggregating and transmitting sensed data in wireless sensor networks.

BACKGROUND OF THE INVENTION

Wireless sensor networks (WSNs) are gaining worldwide popularity due to their broad applications in different environments, including office, home, and hostile areas. Such WSNs may present a meaningful and efficient solution to challenging problems, such as building safety monitoring, vehicle tracking, wildlife tracking, and environmental surveillance. Advances in micro electromechanical system technology (MEMS), combined with radio frequency (RF) circuits and low cost, low power digital signal processors (DSPs), improve feasibility of these sensor networks.

A WSN may consist of multiple sensors that sense data of interest and transmit the sensed data, directly or indirectly, to a remote database for further processing. The sensors in the WSN are usually power constrained and have limited computational and communication power. Therefore it may be desirable to maximize lifetime of the sensors under this constraint. The lifetime of the sensors depends on effective energy saving strategies such as sensor scheduling and in-network information processing to reduce the amount of sensed data transmitted to a remote database.

One exemplary in-network information processing technique is data aggregation, which has been utilized as a paradigm for wireless routing in sensor networks. Since sensors are usually energy constrained, it may be inefficient and power consuming for all of the sensors to transmit sensed data directly to a remote database for processing. Data sensed by neighboring sensors is often highly correlated and hence redundant. In addition, the amount of the sensed data in a WSN of large size is usually very large for a remote database to process. Data aggregation is a technique that can aggregate data at neighboring sensors or intermediate sensors, which may reduce the amount of the sensed data transmitted to the remote database. As a result, data aggregation can save energy and improve bandwidth utilization for the WSN.

FIG. 1 illustrates a conventional clustered WSN 100. With reference to FIG. 1, the WSN 100 includes non-overlapping clusters 102-1, 102-2, . . . , 102-N (N is the total number of clusters in the WSN 100) with a fixed aggregator or cluster head 104-1, 104-2, . . . , 104-N in each cluster. Each sensor 106-1, 106-2, . . . , 106-M (M is the total number of sensors in the WSN 100) senses certain parameters, such as temperature, pressure, or humidity, of an environment, and encrypts sensed data. Each sensor 106-1, 106-2, . . . , 106-M then transmits its encrypted data to the one of the fixed aggregators 104-1, 104-2, . . . , 104-N in its own cluster. Each fixed aggregator 104-1, 104-2, . . . , 104-N may receive and decrypt the encrypted data received from different sensors in its own cluster and aggregate the decrypted data. Each fixed aggregator 104-1, 104-2, . . . , 104-N may then encrypt the aggregated data and wirelessly transmit the encrypted and aggregated data to a remote database 108 for further processing.

While data aggregation can help improve bandwidth utilization and conserve energy resources by reducing data redundancy, fixed aggregators are usually needed to perform data aggregation. When fixed aggregators perform aggregation of encrypted data received from different sensors in their own cluster, the fixed aggregators may need to decrypt the encrypted data before data aggregation. As a result, security issues may exist in WSNs including such fixed aggregators. Such security issues include data secrecy and data privacy. In terms of data secrecy, sensed data should be protected from attacks, such as known-ciphertext attacks, known-plaintext attacks, and relay attacks, during data transmission. In terms of privacy, sensed data should remain secret to the fixed aggregators. For example, each fixed aggregator 104-1, 104-2, . . . , 104-N should not know the contents of the sensed data received from any of the sensors 106-1, 106-2, . . . , 106-M in its own cluster.

In addition, sensors and aggregators in a conventional clustered WSN like the WSN 100 are usually in fixed positions once the conventional clustered WSN is deployed. New sensors or aggregators may not be added to, and existing sensors or aggregators may not be removed from, the conventional clustered WSN.

SUMMARY OF THE INVENTION

In accordance with the invention, there is provided a method for transmitting sensed data in a wireless sensor network including multiple sensors and a database, the method comprising: automatically dividing the multiple sensors into sensor groups, each of the sensor groups including at least one sensor; determining a lead sensor in each of the sensor groups; encrypting the sensed data to generate encrypted data in ones of the multiple sensors excluding the determined lead sensors; and transmitting the encrypted data.

Also in accordance with the invention, there is provided a method for aggregating sensed data in a wireless sensor network including multiple sensors and a database, the method comprising: automatically dividing the multiple sensors into sensor groups, each of the sensor groups including at least one sensor; determining a lead sensor in each of the sensor groups; encrypting the sensed data to generate encrypted data in ones of the multiple sensors excluding the determined lead sensors; receiving, by the lead sensors, the encrypted data; and aggregating, by the lead sensors, the received data.

Further in accordance with the invention, there is provided a system for transmitting sensed data in a wireless sensor network, the system comprising multiple sensors, wherein the multiple sensors are configured to: automatically form sensor groups; determine a lead sensor in each of the sensor groups; encrypt the sensed data to generate encrypted data in ones of the multiple sensors excluding the determined lead sensors; wirelessly receive, by the lead sensors, the encrypted data; and aggregate the received data in the lead sensors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this application, illustrate embodiments of the invention and, together with the description, serve to explain the principles of the invention.

FIG. 2C shows a table illustrating elements that may be pre-installed or obtained in a WSN before data transmission, according to an exemplary embodiment.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

In embodiments consistent with the present invention, a wireless sensor network (WSN) including multiple sensors may be automatically divided into non-overlapping sensor groups, with each sensor group including at least one sensor. Lead sensor determination schemes may then be utilized to determine a lead sensor in each of the sensor groups, and any sensor in each of the sensor groups may be determined to be the lead sensor. Ones of the multiple sensors excluding the determined lead sensors sense certain parameters, such as temperature, pressure, or humidity, of their environment, and transmit data to the lead sensor in their own group. In one embodiment, the ones of the multiple sensors excluding the determined lead sensors utilize a light-weight encryption method to encrypt the data. The light-weight encryption method may reduce heavy computation burden on the sensors. For example and without limitation, such light-weight encryption method may use exclusive OR operations and a hash function. The light-weight encryption may also provide data secrecy and privacy to support data aggregation. The lead sensor in the sensor group then aggregates data received from other sensors in that group, and/or from one or more lead sensors. The lead sensor may then transmit the aggregated data to either another lead sensor or a database in the WSN for further processing.

Also in embodiments consistent with the present invention, data aggregation techniques may be utilized to conserve energy resources by reducing data redundancy and to improve bandwidth utilization and resource efficiency. In one embodiment, a data eliminating method is performed in a lead sensor to find redundant data in encrypted data received from two sensors without decrypting the received encrypted data. In addition, the data eliminating method may be performed in the lead sensor to find redundant data in multiple encrypted data from ones of the sensors by pairing off the encrypted data. By iteratively performing the data eliminating method, redundant data in the multiple encrypted data can be eliminated.

Figure 1:
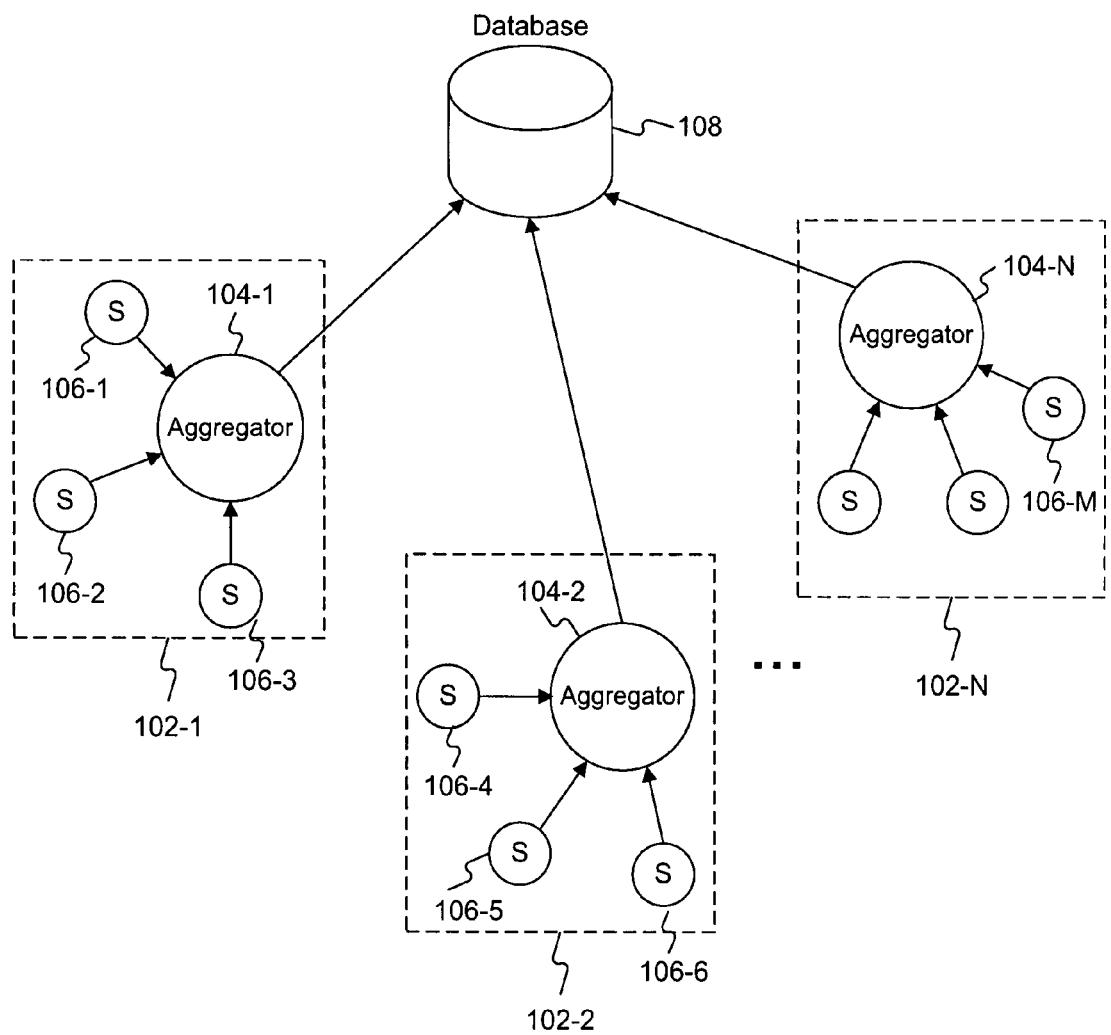
FIG. 1 shows a conventional wireless sensor network.
Figure 2A:
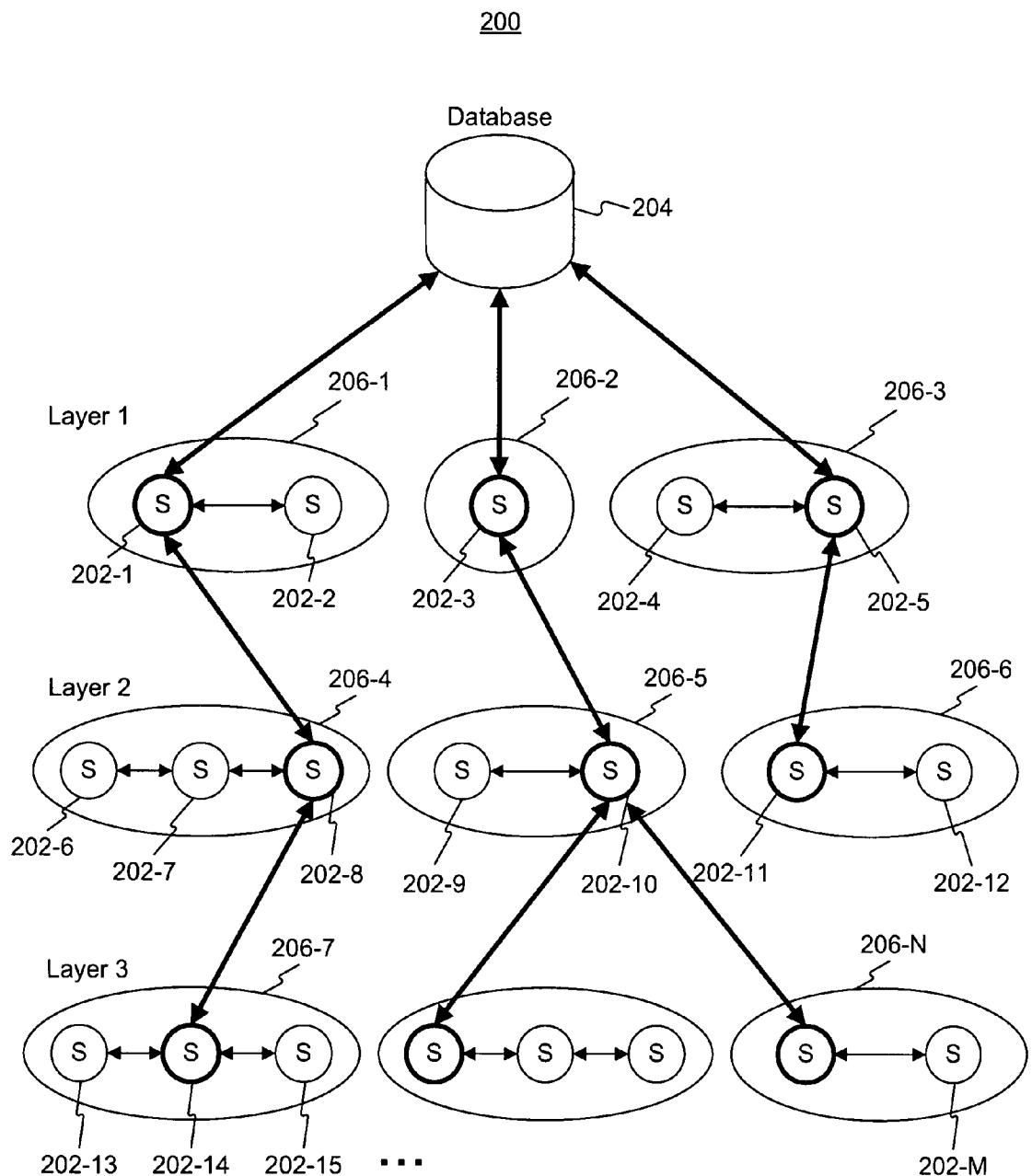
FIGS. 2A and 2B illustrate a system and method for secure data aggregation in a WSN, according to an exemplary embodiment.
Figure 2B:
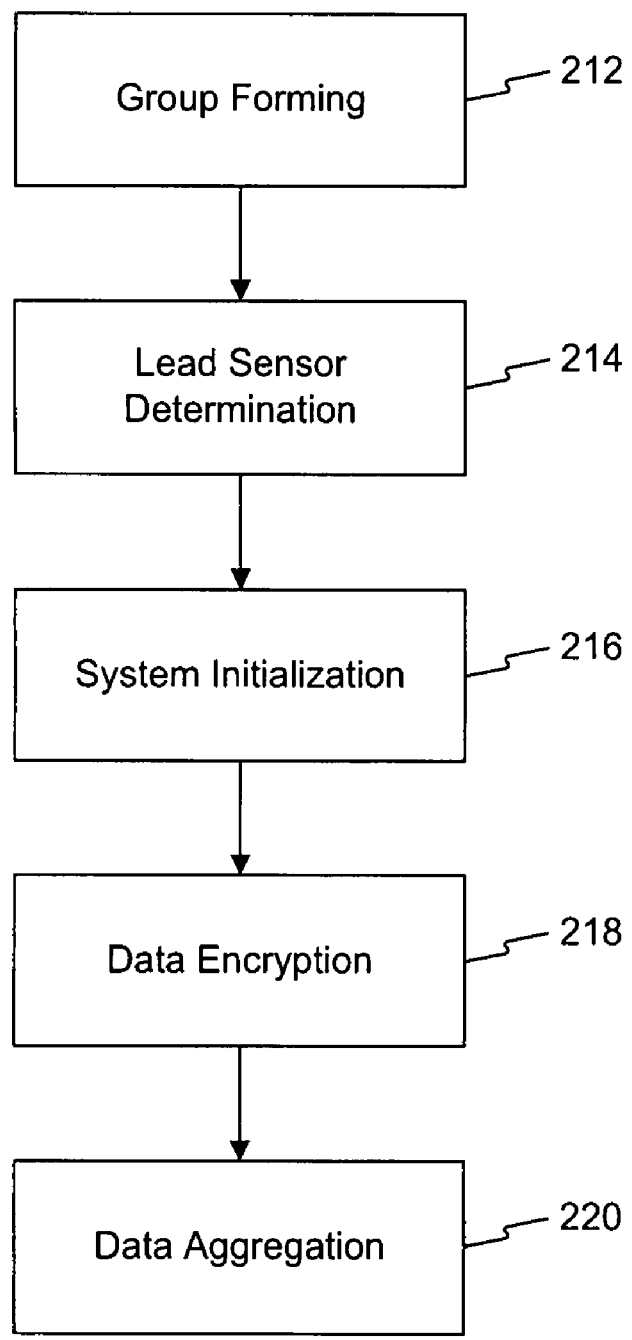

FIGS. 2A and 2B illustrate a system and method for secure data aggregation in a WSN 200, according to an exemplary embodiment. The WSN 200 may be compatible with different communication standards, such as IEEE standard 802.15.4, and extendable to other wireless networks, for example and without limitation, Wireless Fidelity (WiFi) networks, Worldwide Interoperability for Microwave Access (WiMax) networks, and Wireless Broadband (WiBro) networks. After the WSN 200 is deployed, sensors in the WSN 200 are movable. In addition, new sensors may be added to, and existing sensors may be removed from, the WSN 200.

Referring to FIG. 2A, the WSN 200 includes multiple sensors 202-1, 202-2, . . . , 202-M (M is the total number of sensors in the WSN 200) and a remote database 204. Each sensor 202-1, 202-2, . . . , 202-M may be configured to sense certain parameters, such as temperature, pressure, or humidity, of its environment and encrypt sensed data. The remote database 204 may receive encrypted data from ones of the multiple sensors 202-1, 202-2, . . . , 202-M.

Each sensor 202-1, 202-2, . . . , 202-M and the remote database 204 may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, antennas, etc. In addition, each sensor 202-1, 202-2, . . . , 202-M may have a wireless transceiver that can transmit data to the remote database 204 or another sensor in the WSN 200.

FIG. 2B illustrates a method for secure data aggregation in the WSN 200. Referring to FIGS. 2A and 2B, the sensors 202-1, 202-2, . . . , 202-M may be automatically divided into non-overlapping sensor groups 206-1, 206-2, . . . , 206-N during system setup (step 212). For example, multiple layers of sensors may be formed in the WSN 200 to facilitate the sensors 202-1, 202-2, . . . , 202-M being divided into the sensor groups 206-1, 206-2, . . . , 206-N. For convenience of illustration only, three layers (i.e., Layer 1, Layer 2, and Layer 3) are shown in FIG. 2A, with Layer 1 being the highest layer and Layer 3 being the lowest layer. However, any number of layers may be formed to facilitate the sensors 202-1, 202-2, . . . , 202-M being divided into groups. In each of the sensor groups 206-1, 206-2, . . . , 206-N, a lead sensor (e.g., any of those sensors shown in bold line in FIG. 2A) is determined to perform aggregation of encrypted data received from other sensors in its own group, and/or from one or more lead sensors in lower layers (step 214). Any sensor in each of the sensor groups 206-1, 206-2, . . . , 206-N may be determined to be the lead sensor.

The sensors 202-1, 202-2, . . . , 202-M and the remote database 204 are initialized by having one or more functions and keys pre-installed or obtained before data transmission (step 216). Non-lead sensors, i.e., the ones of the sensors 202-1, 202-2, . . . , 202-M excluding those determined to be lead sensors, sense certain parameters, such as temperature, pressure, or humidity, of their environment and acquire sensed data. The non-lead sensors encrypt the sensed data with their pre-installed keys and functions (step 218), and then transmit the encrypted data to the lead sensor in their own group, directly or indirectly. For example, the sensor 202-7 in the sensor group 206-4 may directly transmit encrypted data to the lead sensor 202-8 in its group. The sensor 202-6 may transmit encrypted data to the sensor 202-7 in its group and the sensor 202-7 may then forward the encrypted data received from the sensor 202-6 to the lead sensor 202-8 in that group.

A first lead sensor may use its pre-installed or obtained functions and keys to perform data aggregation upon receiving encrypted data from other sensors in its own group and/or from one or more lead sensors in lower layers, to reduce data redundancy (step 220). Data aggregated by the first lead sensor may then be sent to a second lead sensor, which is located one layer higher than the first lead sensor, for further aggregation, or be sent to the remote database 204 for processing. For example, the lead sensor 202-8 of the group 206-4 in Layer 2 may perform aggregation of encrypted data received from the sensors 202-6 and 202-7 in its own group and from the lead sensor 202-14 of the group 206-7 in Layer 3. Data aggregated by the lead sensor 202-8 may then be sent to the lead sensor 202-1 of the group 206-1 in Layer 1. The lead sensor 202-1 may then perform aggregation of the encrypted data received from the lead sensor 202-8 and encrypted data received from the sensor 202-2 in its own group. Data aggregated by the lead sensor 202-1 may further be sent to the remote database 204 for processing. Each of the steps 212, 214, 216, and 218 will be further described below.

As noted above, the sensors 202-1, 202-2, . . . , 202-M may form multiple layers in the WSN 200 and automatically be divided into non-overlapping groups 206-1, 206-2, . . . , 206-N during system setup (step 212 in FIG. 2B). In one embodiment, layers in WSN 200 may be determined by reception of beacon signals from a transmitter associated with the database 204 or one of the sensors 202-1, 202-2, . . . , 202-M. For example, sensors that have good reception of beacon signals from the transmitter associated with the database 204 may form Layer 1. A good reception signal may be a received signal having a strength larger than a prescribed value. The sensors in Layer 1 may be relatively close to the transmitter associated with the database 204 and therefore have good reception of beacon signals from that transmitter. Sensors that do not have good reception of beacon signals from the transmitter associated with the database 204, but have good reception of beacon signals from any of the sensors in Layer 1, may form Layer 2. Similarly, sensors that do not have good reception of beacon signals from both the transmitter associated with the database 204 and the sensors in Layer 1, but have good reception of beacon signals from any of the sensors in Layer 2, may form Layer 3. In other words, a first sensor in Layer K (K is an integer larger than 1) may have good reception of beacon signals from a second sensor in Layer K−1, but may not have good reception of beacon signals from any sensor in layers higher than Layer K−1 in the WSN 200.

In one embodiment, the transmitter associated with the database 204 may transmit to each one of the sensors 202-1, 202-2, . . . , 202-M a beacon signal including information which indicates a distance from the one of the sensors 202-1, 202-2, . . . , 202-M to the database 204. The sensors 202-1, 202-2, . . . , 202-M may form multiple layers in the WSN 200 based on their distance to the database 204. For example, ones of the sensors 202-1, 202-2, . . . , 202-M which have a distance to the database 204 within a range may form a layer in the WSN 200.

In one embodiment, one or more sensors in the same layer in the WSN 200 may form a sensor group, with each sensor belonging to only one group. For example, the sensors 202-1 and 202-2 in Layer 1 may form the sensor group 206-1, and the sensors 202-6, 202-7, and 202-8 in Layer 2 may form the sensor group 206-4. The sensors 202-1, 202-2, . . . , 202-M are therefore divided into the non-overlapping sensor groups 206-1, 206-2, . . . , 206-N in the WSN 200. If a sensor group includes more than one sensor, any sensor in the group can communicate with at least another sensor in that group.

For example, a first one of the sensors 202-1, 202-2, . . . , 202-M may transmit a first signal including information indicating its ID and layer number (e.g., Layer 1, Layer 2, or Layer 3). If ones of the sensors 202-1, 202-2, . . . , 202-M receive the first signal or have good reception of the first signal, and determine that they are in the same layer with the first sensor, the first sensor and the ones of the sensors 202-1, 202-2, . . . , 202-M may form a sensor group.

In embodiments consistent with the present invention, different methods may be applied to determine a lead sensor in each one of the sensor groups 206-1, 206-2, . . . , 206-N with multiple sensors (step 214 in FIG. 2B). For example, a sensor currently having the most power in its group may be determined to be a lead sensor in that group, since data aggregation is usually more power-consuming than data sensing. Also for example, a sensor with a minimum received signal strength from remaining sensors in its group may be determined to be a lead sensor in that group. The received signal strength of each sensor in the group may be determined by received signal strength indication (RSSI) of that sensor. As a further example, a sensor with a minimum average distance to remaining sensors in its group may be determined to be a lead sensor in that group. As another example, a lead sensor in a group may be determined by randomly choosing a sensor in the group as the lead sensor.

In one embodiment, a first lead sensor in the WSN 200 may receive signals from multiple lead sensors which are one layer lower than the first lead sensor. The first lead sensor may perform data transmission with one of the multiple lead sensors which has minimum power consumption.

FIG. 2C shows a table 230 illustrating functions and keys that may be pre-installed in or obtained by the sensors 202-1, 202-2, . . . , 202-M and the remote database 204 in the WSN 200 before data transmission, according to an exemplary embodiment. Referring to FIGS. 2A and 2C, a one-way hash function g, an initial encryption key $K_i^{EK}(0)$, and a verification key $K_i^{VK}$ may be pre-installed in an $i^{th}$ one of the non-lead sensors. The verification key $K_i^{VK}$ is different for each of the non-lead sensors. A one-way hash function g has the following property:

$$g(x \oplus y) = g(x) \oplus g(y),$$

where x and y denote the keys, and "$\oplus$" denotes an exclusive OR operation, generally symbolized by XOR, on two operands. The one-way hash function g and aggregation keys may be pre-installed in each lead sensor. Aggregation keys in a lead sensor of a sensor group include all of the XOR values on any two verification keys of two sensors, each of the two sensors being among the non-lead sensors, and in the same group with or a descendant of that lead sensor. A first sensor in the WSN 200 is a descendant of a second sensor in the WSN 200 if the first sensor is in a lower layer than the second sensor and can transmit data to the second sensor, directly or indirectly. For example, the sensors 202-6, 202-7, 202-8, 202-13, 202-14, and 202-15 are all descendants of the sensor 202-1. The one-way hash function g and all the verification keys in the non-lead sensors are pre-installed in the remote database 204.

Figure 3A:
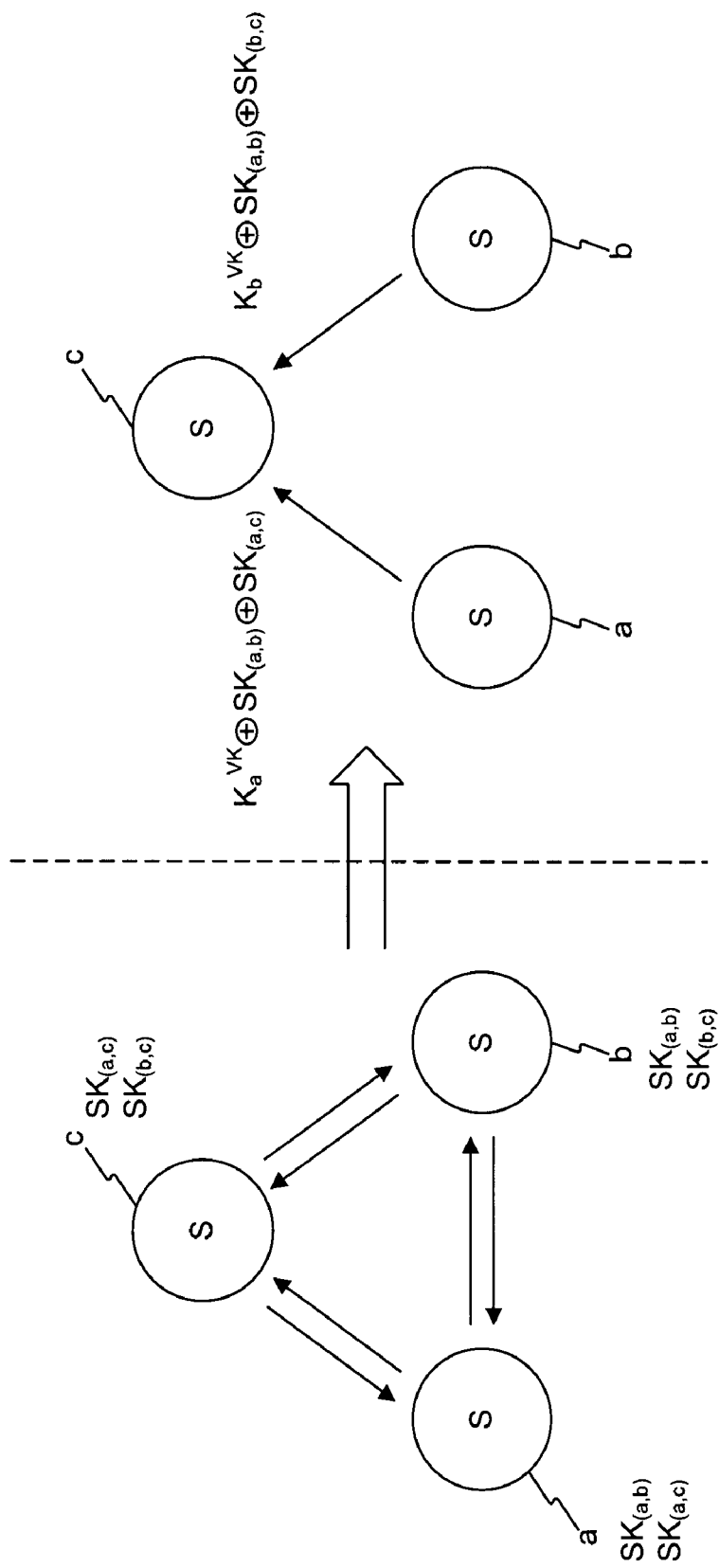
FIG. 3A shows a first key exchange method for a lead sensor to obtain an aggregation key for two sensors in a WSN, according to an exemplary embodiment.
Figure 3B:
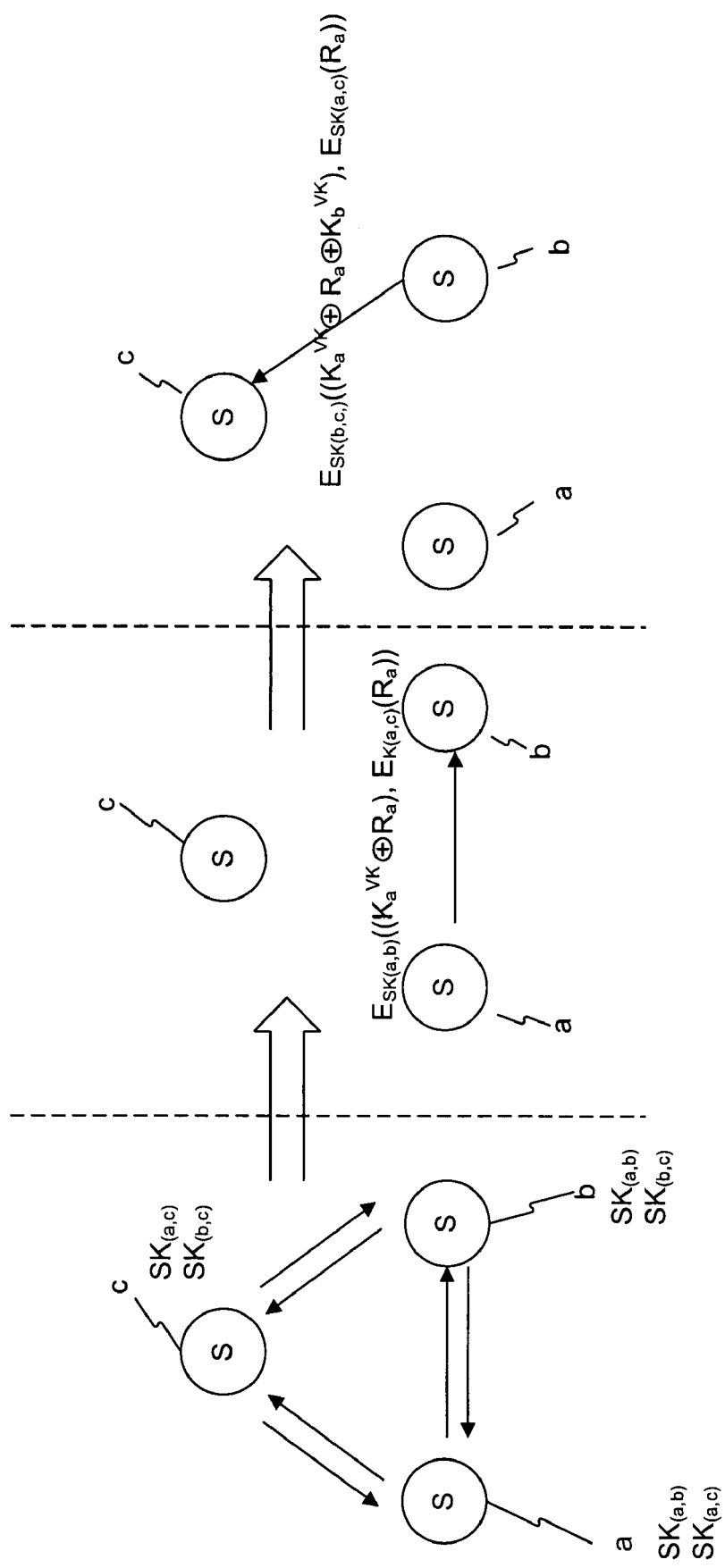
FIG. 3B shows a second key exchange method for a lead sensor to obtain an aggregation key for two sensors in a WSN, according to an exemplary embodiment.

Additionally or alternatively, a lead sensor of a sensor group may obtain its aggregation keys by utilizing key exchange methods. FIGS. 3A and 3B show first and second key exchange methods for a lead sensor c to obtain an aggregation key for two sensors a and b, according to an exemplary embodiment. Referring to FIGS. 3A and 3B, a sharing key may be generated for any two of the three sensors a, b, and c, and the sharing key may then be stored on each of the two sensors. For example, a first sharing key $SK_{(a,\,b)}$ may be generated for the sensors a and b, and may then be stored in each of the sensors a and b. A second sharing key $SK_{(a,\,c)}$ may be generated for the sensors a and c, and may then be stored in each of the sensors a and c. A third sharing key $SK_{(b,\,c)}$ may be generated for the sensors b and c, and may then be stored in each of the sensors b and c.

Referring to FIG. 3A, in the first key exchange method, the sensors a and b may respectively execute the following XOR operations:

$$K_a^{VK} \oplus SK_{(a,b)} \oplus SK_{(a,c)}, \text{ and}$$

$$K_b^{VK} \oplus SK_{(a,b)} \oplus SK_{(b,c)},$$

and send a calculated result to the sensor c, which, in this example, is designated the lead sensor of a sensor group consisting of the sensors a, b, and c. The $K_a^{VK}$ and $K_b^{VK}$ in the above equations are verification keys which are pre-installed in the sensors a and b, respectively. Once receiving the calculated results from the sensors a and b, the lead sensor c may execute the following XOR operations:

$$K_a^{VK} \oplus SK_{(a,b)} \oplus SK_{(a,c)} \oplus K_b^{VK} \oplus SK_{(a,b)} \oplus SK_{(b,c)} \oplus SK_{(a,c)} SK_{(b,c)},$$

which is equal to $K_a^{VK} \oplus K_b^{VK}$, to obtain an aggregation key for the sensors a and b.

Referring to FIG. 3B, in the second key exchange method, an encryption algorithm "E" and a corresponding decryption algorithm "$E^{-1}$" may be executed by each of the sensors a, b, and c. In the example shown in FIG. 3B, the sensor c is again designated the lead sensor. The sensor a may first generate a random number Ra and encrypt its verification key $K_a^{VK}$ with the algorithm "E" as follows:

$$E_{SK(a,b)}((K_a^{VK} \oplus Ra), E_{SK(a,c)}(Ra)),$$

and send a first encrypted result to the sensor b. Once receiving the first encrypted result, the sensor b may decrypt the first encrypted result as follows:

$$E^{-1}{}_{SK(a,b)}(E_{SK(a,b)}((K_a^{VK} \oplus Ra), E_{SK(a,c)}(Ra)))$$

to obtain two intermediate values $K_a^{VK} \oplus Ra$ and $E_{SK(a,\,c)}(Ra)$. The sensor b may then encrypt its verification key KbVK together with the two intermediate values $K_a^{VK} \oplus Ra$ and $E_{SK(a,\,c)}(Ra)$ as follows:

$$E_{SK(b,c)}((K_a^{VK} \oplus Ra \oplus K_b^{VK}), E_{SK(a,c)}(Ra)),$$

and send a second encrypted result to the lead sensor c. Once receiving the second encrypted result, the lead sensor c may decrypt the second encrypted result and obtain the aggregation key $K_a^{VK} \oplus K_b^{VK}$ for the sensors a and b.

Figure 4:
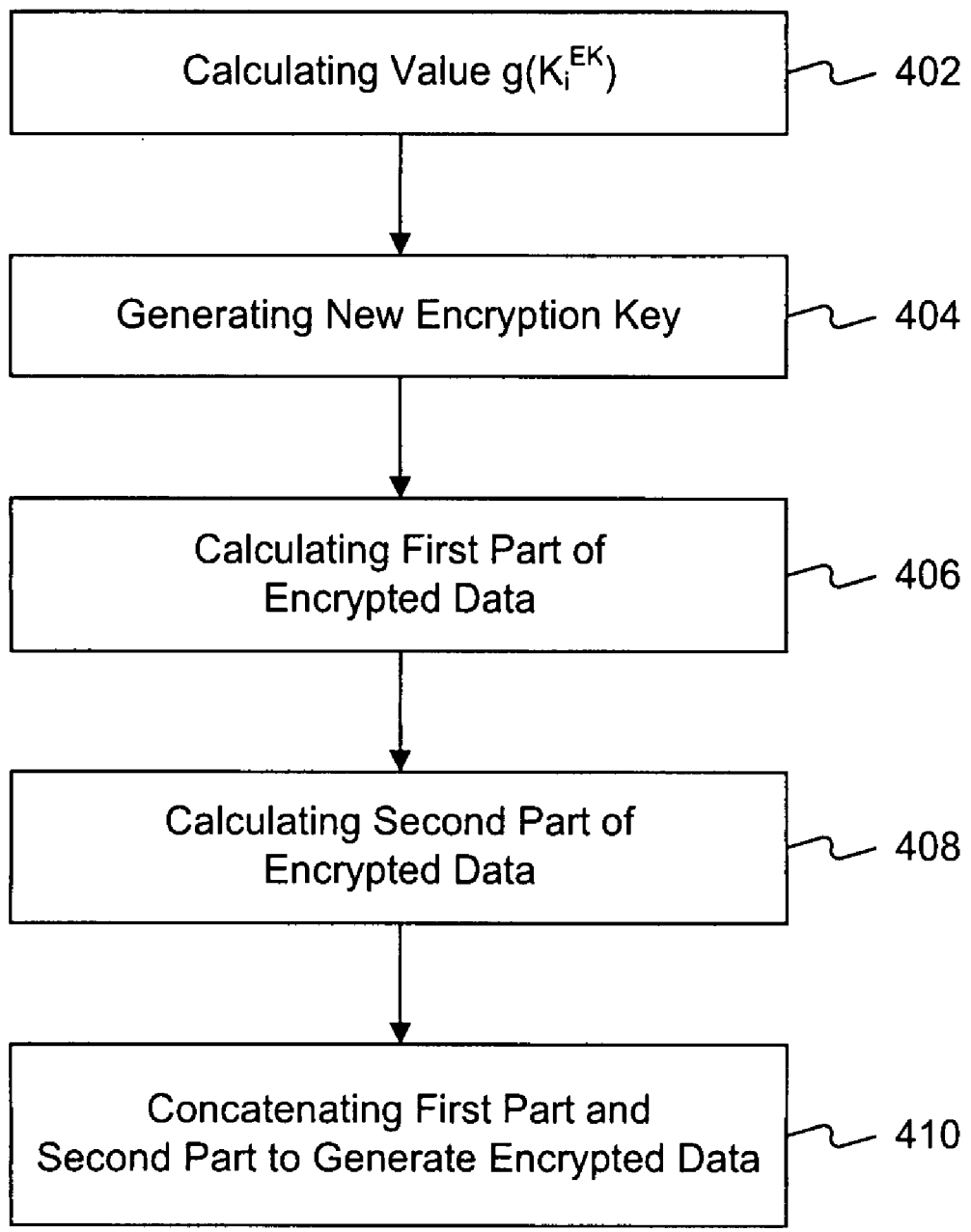
FIG. 4 illustrates a light-weight encryption method for practice by a non-lead sensor in a WSN, according to an exemplary embodiment.

As noted above, the non-lead sensors sense certain parameters, such as temperature, pressure, or humidity, of their environment and acquire sensed data. The non-lead sensors may encrypt the sensed data with their pre-installed keys and functions (step 218 in FIG. 2B), and then transmit the encrypted data to the lead sensor in their own group, directly or indirectly. FIG. 4 illustrates a lightweight encryption method for practice by a non-lead sensor i in a WSN to encrypt sensed data $m_i$, according to an exemplary embodiment. For example, the sensor i may be any one of the sensors in the WSN 200 excluding the lead sensors. When the sensor i senses certain parameters, such as temperature, pressure, or humidity, of its environment and needs to transmit sensed data $m_i$ to the lead sensor in its own group, it first uses its pre-installed one-way hash function g and an encryption key $K_i^{EK}$ (e.g., the initial encryption key $K_i^{EK}(0)$) to calculate a value $g(K_i^{EK})$ (step 402). The sensor i then randomly generates a new encryption key for its next data transmission (step 404). The sensor i further processes the sensed data $m_i$ by executing the following XOR operations:

$$m_i \oplus g(K_i^{EK}) \oplus + K_i^{EK} \text{ (step 406), and}$$

$$K_i^{EK} \oplus K_i^{VK} \text{ (step 408)}$$

separately. The sensor i then concatenates the operation results ($m_i \oplus g(K_i^{EK}) \oplus K_i^{EK}$ as a first part and $K_i^{EK} \oplus K_i^{VK}$ as a second part) to generate corresponding encrypted data $E_i(m_i)$ as follows:

$$E_i(m_i) = m_i \oplus g(K_i^{EK}) \oplus K_i^{EK} \| K_i^{EK} \oplus K_i^{VK} \text{ (step 410)},$$

where "$\|$" indicates data concatenation. Finally the sensor i transmits the encrypted data $E_i(m)$ to the lead sensor in its group, directly or indirectly. The lead sensor may receive multiple encrypted data from different sensors including the sensor i, and use its pre-installed or obtained functions and keys to perform data aggregation and eliminate redundant data in the multiple encrypted data without decrypting the encrypted data.

Figure 5A:
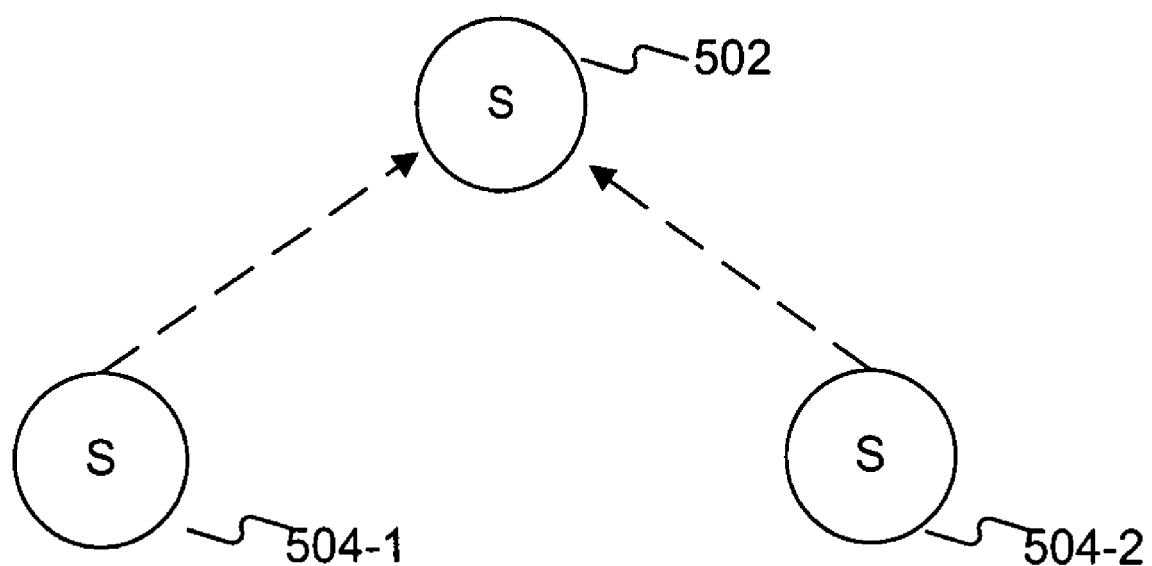
FIGS. 5A and 5B illustrate a data eliminating method performed in a lead sensor to find redundant data in encrypted data received from two sensors, according to an exemplary embodiment.
Figure 5B:
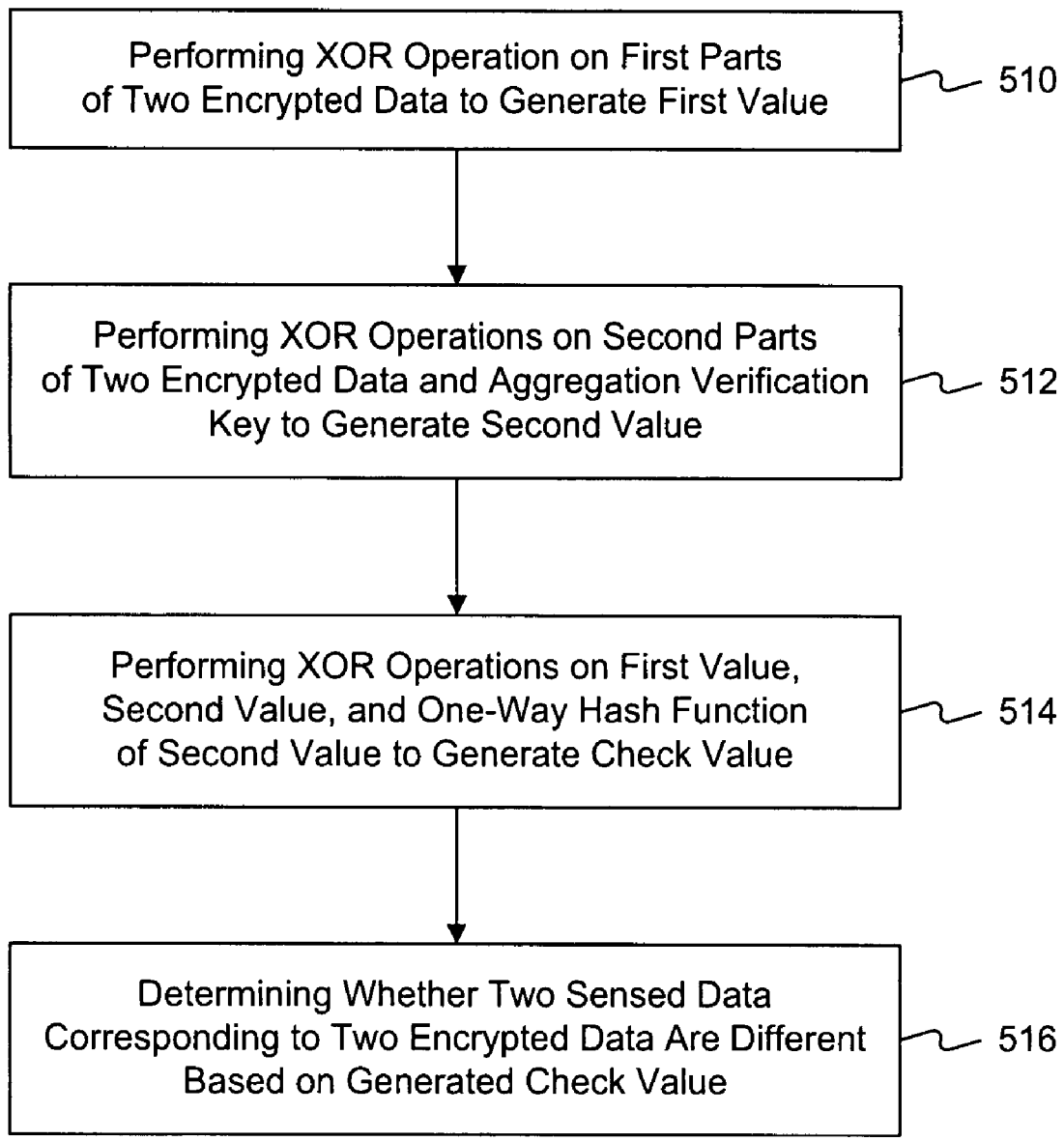

FIGS. 5A and 5B illustrate a data eliminating method performed by a lead sensor 502 to find redundant data in two encrypted data $E_i(m_i)$ and $E_j(m_j)$ directly or indirectly received from two sensors 504-1 and 504-2, respectively, without decrypting the received encrypted data, according to an exemplary embodiment. The lead sensor 502 may be one of the lead sensors in the WSN 200 (FIG. 2A). The sensors 504-1 and 504-2 each may be a descendant of or in the same sensor group with the lead sensor 502. As noted above, the two encrypted data $E_i(m_i)$ and $E_j(m_j)$ transmitted to the lead sensor 502 from the two sensors 504-1 and 504-2, respectively, can be expressed as follows:

$$E_i(m_i = m_i \oplus g(K_i^{EK}) \oplus K_i^{EK} \| K_i^{EK} \oplus K_i^{VK}, \quad \text{Equation (1)}$$

and $$E_j(m_j = m_j \oplus g(K_j^{EK}) \oplus K_j^{EK} \| K_j^{EK} \oplus K_j^{VK}, \quad \text{Equation (2)}$$

where $m_i$ is sensed data from the sensor 504-1, g is a pre-installed one-way hash function, $K_i^{EK}$ is an encryption key in the sensor 504-1, $K_i^{VK}$ is a verification key in the sensor 504-1, $m_j$ is sensed data from the sensor 504-2, $K_j^{EK}$ is an encryption key in the sensor 504-2, and $K_j^{VK}$ is a verification key in the sensor 504-2. The lead sensor 502 first performs an XOR operation on first parts of the two encrypted data $E_i(m_i)$ and $E_j(m_j)$ as follows (FIG. 5B, step 510):

$$m_i \oplus g(K_i^{EK}) \oplus K_i^{EK} \oplus m_j \oplus g(K_j^{EK}) \oplus K_j^{EK}. \quad \text{Equation (3)}$$

The aggregation keys in the sensor 502 include all of the XOR values on any two verification keys of two sensors, each of the two sensors being a descendant of or in the same sensor group with the lead sensor 502. As a result, the lead sensor 502 may then perform XOR operations on second parts of the two encrypted data $E_i(m_i)$ and $E_j(m_j)$ and the aggregation key (i.e., $K_i^{VK} \oplus K_j^{VK}$) as follows (step 512):

$$K_i^{EK} \oplus K_i^{VK} \oplus K_j^{EK} \oplus K_j^{VK} \oplus K_i^{VK} \oplus K_j^{VK},$$

which is equal to:

$$K_i^{EK} \oplus K_j^{EK}. \quad \text{Equation (4)}$$

As shown above, the lead sensor 502 can use the encrypted data $E_i(m_i)$ and $E_j(m_j)$ to retrieve $K_i^{EK} \oplus K_j^{EK}$, but cannot retrieve $K_i^{EK}$ or $K_j^{EK}$ separately. Therefore the lead sensor 502 cannot decrypt the encrypted data $E_i(m_i)$ and $E_j(m_j)$. As a result, data secrecy and privacy are provided for the WSN.

Next, the lead sensor 502 performs XOR operations on Equation (3), Equation (4), and $g(K_i^{EK} \oplus K_j^{EK})$ to obtain a check value $V_{i,j}$ as follows (step 514):

$$V_{i,j} = m_i \oplus g(K_i^{EK}) \oplus K_i^{EK} \oplus m_j \oplus g(K_j^{EK}) \\ \oplus K_j^{EK} \oplus K_i^{EK} \oplus K_j^{EK} \oplus g(K_i^{EK} \oplus K_j^{EK}), \quad \text{Equation (5)}$$

where the one-way hash function g is pre-installed in the lead sensor 502. As noted above, the one-way hash function g has the following property:

$$g(x \oplus y) = g(x) \oplus g(y).$$

Therefore Equation (5) can be expressed as:

$$V_{i,j} = m_i \oplus g(K_i^{EK}) \oplus K_i^{EK} \oplus m_j \oplus g(K_j^{EK}) \\ \oplus K_j^{EK} \oplus K_i^{EK} \oplus K_j^{EK} \oplus g(K_i^{EK}) \oplus g(K_j^{EK}),$$

which can be further reduced to:

$$\begin{aligned} V_{i,j} &= m_i \oplus g(K_i^{EK}) \oplus K_i^{EK} \oplus m_j \oplus g(K_j^{EK}) \oplus K_j^{EK} \oplus \\ & \quad K_i^{EK} \oplus K_j^{EK} \oplus g(K_i^{EK}) \oplus g(K_j^{EK}) \\ &= m_i \oplus m_j \oplus g(K_i^{EK}) \oplus g(K_i^{EK}) \oplus K_i^{EK} \oplus K_i^{EK} \oplus \\ & \quad g(K_j^{EK}) \oplus g(K_j^{EK}) \oplus K_j^{EK} \oplus K_j^{EK} \\ &= m_i \oplus m_j. \end{aligned}$$

As a result, if the sensed data $m_i$ from the sensor 504-1 is equal to the sensed data $m_j$ from the sensor 504-2, the check value $V_{i,j}$ will be zero. Otherwise the check value $V_{i,j}$ will be one, as illustrated by the following equations:

$$V_{i,j} = 0, \text{ if } m_i = m_j,$$

$$V_{i,j} = 1, \text{ otherwise}.$$

Based on the check value $V_{i,j}$ the lead sensor 502 determines whether the encrypted data $E_i(m_i)$ and/or $E_j(m_j)$ need to be transmitted to another lead sensor for further aggregation or a remote database (not shown in FIG. 5A) in step 516. If $V_{i,j}=0$, which means the sensed data $m_i$ from the sensor 504-1 is equal to the sensed data $m_j$ from the sensor 504-2, the lead sensor 502 may transmit either the encrypted data $E_i(m_i)$ or $E_j(m_j)$, but not both, to either another lead sensor or the remote database, to reduce data redundancy and improve bandwidth utilization. If $V_{i,j}=1$, which means the sensed data $m_i$ from the sensor 504-1 is different from the sensed data $m_j$ from the sensor 504-2, the lead sensor 502 may transmit both the encrypted data $E_i(m_i)$ and $E_j(m_j)$ to either another lead sensor or the remote database. In one embodiment, when $V_{i,j}=1$, the lead sensor 502 may transmit a concatenation of $E_i(m_i)$ and $E_j(m_j)$, $E_i(m_i) \| E_j(m_j)$, to either another lead sensor or the remote database.

Figure 6A:
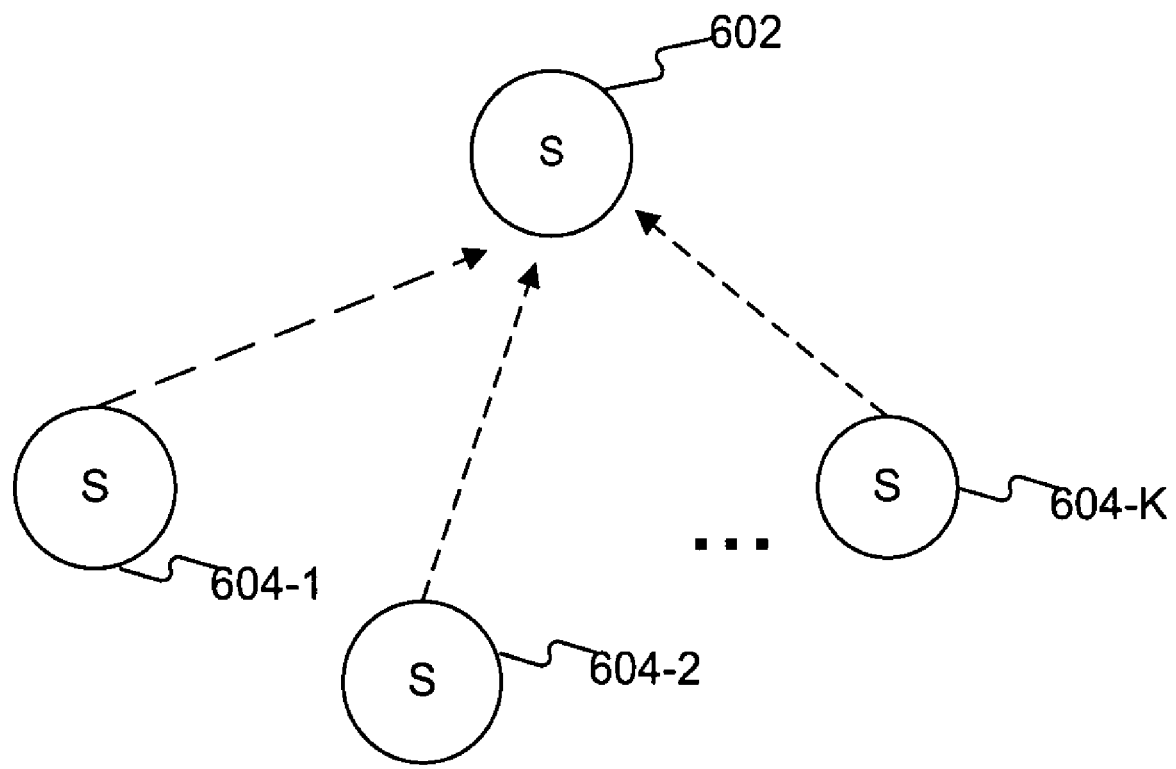
FIGS. 6A and 6B illustrate a data eliminating method performed in a lead sensor to find redundant data in encrypted data received from multiple sensors, according to an exemplary embodiment.
Figure 6B:
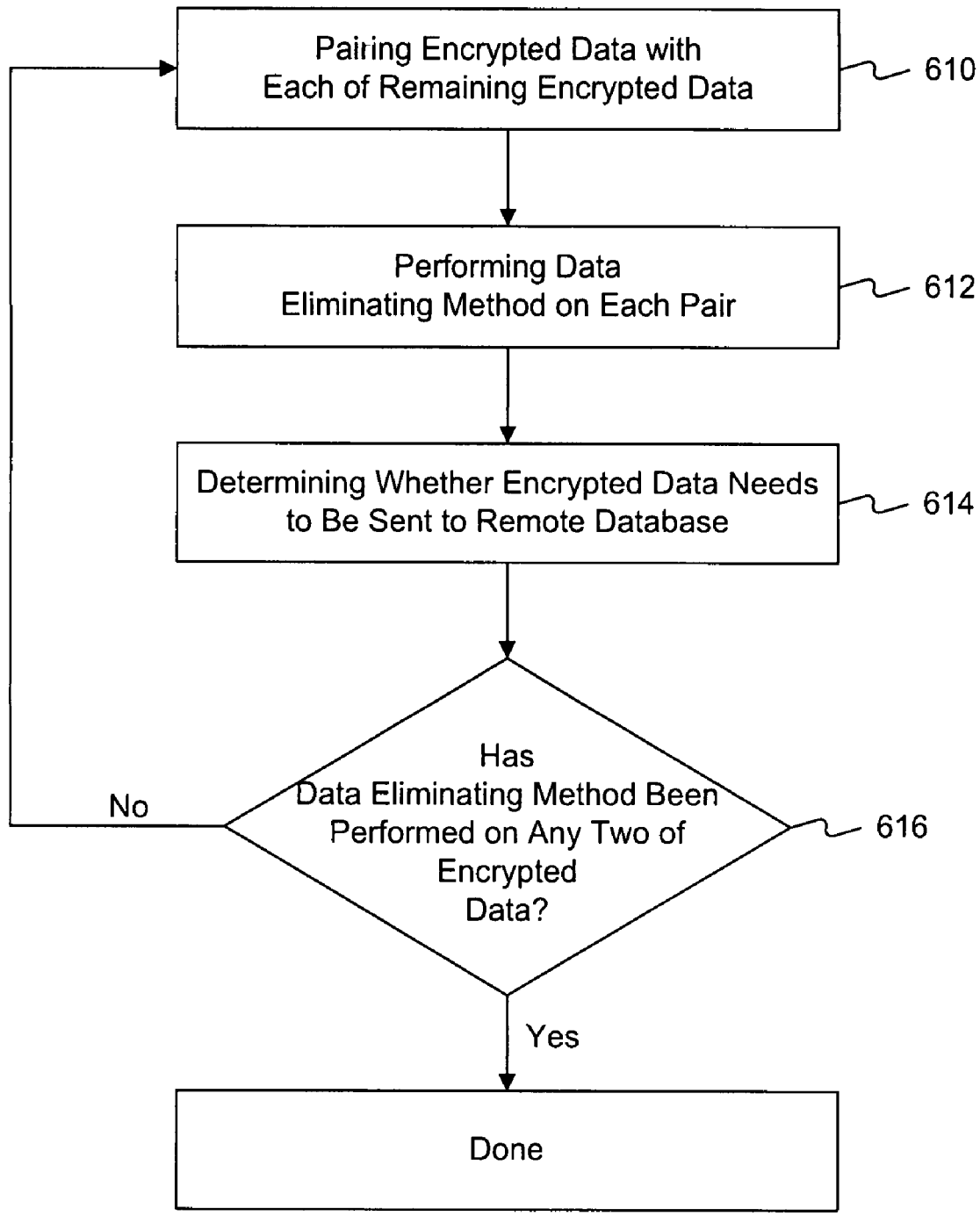

FIGS. 6A and 6B illustrate a data eliminating method performed in a lead sensor 602 to find redundant data in multiple encrypted data $E_1(m_1), E_2(m_2), \ldots, E_k(m_k)$ directly or indirectly received from sensors 604-1, 604-2, . . . , 604-K, respectively, without decrypting the multiple encrypted data, according to an exemplary embodiment. The lead sensor 602 may be one of the lead sensors in the WSN 200 (FIG. 2A). The sensors 604-1, 604-2, . . . , 604-K each may be a descendant of or in the same sensor group with the lead sensor 602. In one embodiment, the lead sensor 602 may choose the encrypted data $E_1(m_1)$ and separately pair the encrypted data $E_1(m_1)$ with each of the remaining encrypted data $E_2(m_2), E_3(m_3), \ldots, E_k(m_k)$ (FIG. 6B, step 610). For each pair, the data eliminating method described above for two encrypted data is performed in the lead sensor 602 to calculate check values $V_{1,2}, V_{1,3}, \ldots, V_{1,K}$ and find redundant data in the two encrypted data $E_1(m_1)$ and $E_j(m_j)$, where $j=2, 3, \ldots, k$ (step 612). By calculating the check values $V_{1,2}, V_{1,3}, \ldots, V_{1,K}$ for each pair, the lead sensor 602 may determine whether or not the encrypted data $E_1(m_1)$ is redundant and needs to be transmitted to either another lead sensor for further aggregation or to a remote database (not shown in FIGS. 6A and 6B) (step 614).

For example, if all of the check values $V_{1,2}, V_{1,3}, \ldots, V_{1,k}$ are equal to one, which means the encrypted data $E_1(m_1)$ is different from any of the remaining encrypted data $E_2(m_2), E_3(m_3), \ldots, E_K(m_K)$, the lead sensor 602 may determine the need to transmit the encrypted data $E_1(m_1)$ to either another lead sensor or the remote database. Otherwise the encrypted data $E_1(m_1)$ is eliminated.

Similarly, the lead sensor 602 then chooses the next encrypted data $E_2(m_2)$ and separately pairs the encrypted data $E_2(m_2)$ with each of the remaining encrypted data $E_3(m_3), E_4(m_4), \ldots, E_k(m_k)$, to determine whether the encrypted data $E_2(m_2)$ is redundant and needs to be transmitted to either another lead sensor or the remote database. This process continues until the data eliminating method has been performed on any two of the multiple encrypted data $E_1(m_1), E_2(m_2), \ldots, E_k(m_k)$ (step 616). By iteratively performing the data eliminating method on two encrypted data, redundant data in the multiple encrypted data $E_1(m_1), E_2(m_2), \ldots, E_k(m_k)$ can be eliminated.

Figure 7:
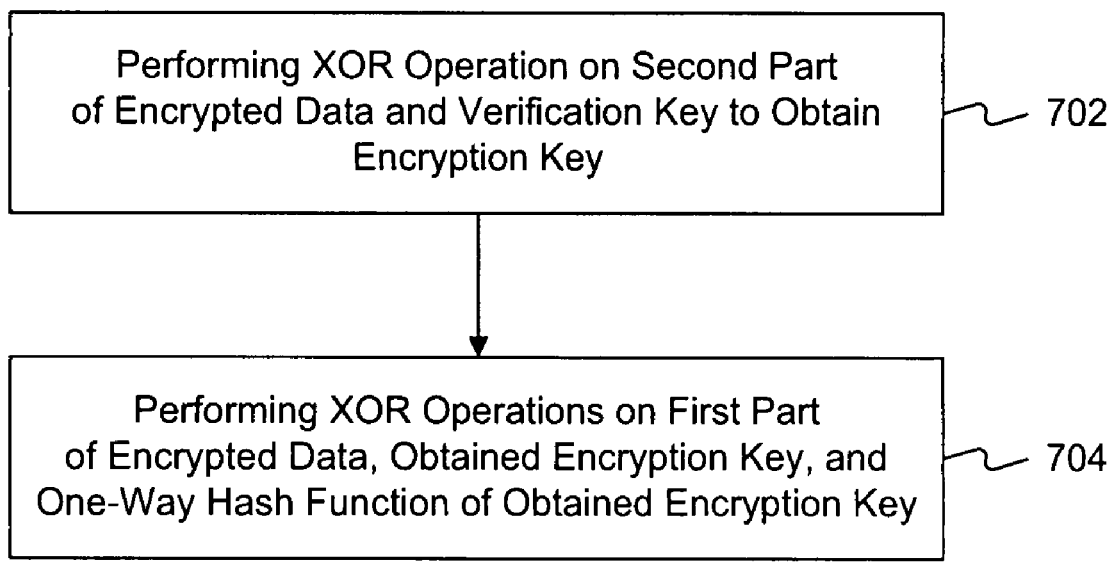
FIG. 7 illustrates a method performed in a database to decrypt encrypted data, according to an exemplary embodiment.

FIG. 7 illustrates a method performed in the database 204 to decrypt encrypted data received from ones of the lead sensors in the WSN 200 (FIG. 2A), according to an exemplary embodiment. For example, the ones of the lead sensors may be those lead sensors in Layer 1 in the WSN 200. As noted above, all verification keys in the non-lead sensors are pre-installed in the remote database 204, so that the remote database 204 can use the pre-installed verification keys to obtain encryption keys to the encrypted data received from the ones of the lead sensors. For example, if the remote database 204 needs to obtain the encryption key $K_i^{EK}$ to the encrypted data $E_i(m_i)$, which is expressed in Equation (1), the remote database 204 performs an XOR operation on the second part of $E_i(m_i)$ and the verification key $K_i^{VK}$ as follows (step 702):

$$K_i^{EK} \oplus K_j^{VK} \oplus K_i^{VK} = K_i^{EK}.$$

The database then uses the first part of $E_i(m_i)$ and the obtained encryption key $K_i^{EK}$ to decrypt the encrypted data $E_i(m_i)$ as follows (step 704):

$$m_i \oplus g(K_i^{EK}) \oplus K_j^{EK} \oplus K_i^{EK} \oplus g(K_i^{EK}) = m_i,$$

where g is the one-way hash function pre-installed in the remote database 204.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting sensed data in a wireless sensor network including multiple sensors and a database, the method comprising:
    automatically dividing the multiple sensors into sensor groups, each of the sensor groups including at least one sensor;
    determining a lead sensor in each of the sensor groups;
    encrypting the sensed data to generate encrypted data in ones of the multiple sensors excluding the determined lead sensors; and
    transmitting the encrypted data by:
        determining that the sensed data from a first one of the multiple sensors is different from the sensed data from others of the multiple sensors without decrypting the encrypted data; and
        transmitting the encrypted sensed data determined to be different.

2. The method of claim 1, wherein determining the lead sensor comprises selecting, in each of the sensor groups, a one of the sensors having most power in the sensor group as the lead sensor in the sensor group.

3. The method of claim 1, wherein determining the lead sensor comprises selecting, in each of the sensor groups, a one of the sensors having a minimum received signal strength from remaining ones of the sensors in the sensor group as the lead sensor in the sensor group.

4. The method of claim 1, wherein determining the lead sensor comprises selecting, in each of the sensor groups, a one of the sensors having a minimum average distance to remaining ones of the sensors in the sensor group as the lead sensor in the sensor group.

5. The method of claim 1, wherein determining the lead sensor comprises randomly selecting, in each of the sensor groups, a one of the sensors in the sensor group as the lead sensor in the sensor group.

6. The method of claim 1, wherein the ones of the multiple sensors excluding the determined lead sensors are non-lead sensors, the encrypting further comprising:
    generating a first part of the encrypted data by performing $m_i \oplus g(K_i^{EK}) \oplus K_i^{EK}$, wherein $m_i$ denotes the sensed data of an $i^{th}$ one of the non-lead sensors, "$\oplus$" denotes an exclusive OR operation, g denotes a one-way hash function, and $K_i^{EK}$ denotes an encryption key;
    generating a second part of the encrypted data by performing $K_i^{EK} \oplus K_i^{VK}$, wherein $K_i^{VK}$ denotes an verification key; and
    concatenating the first part of the encrypted data and the second part of the encrypted data to generate the encrypted data.

7. The method of claim 6, further including randomly generating the encryption key in the $i^{th}$ one of the non-lead sensors.

8. The method of claim 6, further including pre-installing the verification key in the $i^{th}$ one of the non-lead sensors.

9. The method of claim 6, further including pre-installing a different verification key in each of the non-lead sensors.

10. The method of claim 6, wherein transmitting the encrypted data comprises one of the lead sensors transmitting the encrypted data to the database and the database processing the encrypted data, wherein the processing comprises:
    performing an exclusive OR operation on the verification key and the second part of the encrypted data to obtain the encryption key; and
    performing exclusive OR operations on the encryption key, the one-way hash function of the encryption key, and the first part of the encrypted data.

11. The method of claim 1, wherein transmitting the encrypted data comprises a first sensor in a first one of the sensor groups transmitting the encrypted data to a second sensor in the first sensor group, the second sensor being the lead sensor of the first sensor group.

12. The method of claim 1, wherein transmitting the encrypted data comprises a first sensor in a first one of the sensor groups transmitting the encrypted data to a second sensor in a second one of the sensor groups, the first and second sensors being the lead sensors of the first and second sensor groups, respectively.

13. A method for aggregating sensed data in a wireless sensor network including multiple sensors and a database, the method comprising:
    automatically dividing the multiple sensors into sensor groups, each of the sensor groups including at least one sensor;
    determining a lead sensor in each of the sensor groups;
    encrypting the sensed data to generate encrypted data in ones of the multiple sensors excluding the determined lead sensors;
    receiving, by the lead sensors, the encrypted data; and
    aggregating, by the lead sensors, the received data by:
        determining that the sensed data from a first one of the multiple sensors is different from the sensed data from others of the multiple sensors without decrypting the encrypted data; and
        transmitting the encrypted sensed data determined to be different.

14. The method of claim 13, wherein determining the lead sensor comprises selecting, in each of the sensor groups, a one of the sensors having most power in the sensor group as the lead sensor in the sensor group.

15. The method of claim 13, wherein determining the lead sensor comprises selecting, in each of the sensor groups, a one of the sensors having a minimum received signal strength from remaining ones of the sensors in the sensor group as the lead sensor in the sensor group.

16. The method of claim 13, wherein determining the lead sensor comprises selecting, in each of the sensor groups, a one of the sensors having a minimum average distance to remaining ones of the sensors in the sensor group as the lead sensor in the sensor group.

17. The method of claim 13, wherein determining the lead sensor comprises randomly selecting, in each of the sensor groups, a one of the sensors in the sensor group as the lead sensor in the sensor group.

18. The method of claim 13, wherein the ones of the multiple sensors excluding the determined lead sensors are non-lead sensors, the encrypting further comprising:
    generating a first part of the encrypted data by performing $m_i \oplus g(K_i^{EK}) \oplus K_i^{EK}$, wherein $m_i$ denotes the sensed data of an $i^{th}$ one of the non-lead sensors, "$\oplus$" denotes an exclusive OR operation, g denotes a one-way hash function, and $K_i^{EK}$ denotes an encryption key;
    generating a second part of the encrypted data by performing $K_i^{EK} \oplus K_i^{VK}$, wherein $K_i^{VK}$ denotes an verification key; and
    concatenating the first part of the encrypted data and the second part of the encrypted data to generate the encrypted data.

19. The method of claim 18, further including randomly generating the encryption key in the $i^{th}$ one of the non-lead sensors.

20. The method of claim 18, further including pre-installing the verification key in the $i^{th}$ one of the non-lead sensors.

21. A system for transmitting sensed data in a wireless sensor network, the system comprising multiple sensors, wherein the multiple sensors are configured to:
   automatically form sensor groups;
   determine a lead sensor in each of the sensor groups;
   encrypt the sensed data to generate encrypted data in ones of the multiple sensors excluding the determined lead sensors;
   wirelessly receive, by the lead sensors, the encrypted data; and
   aggregate the received data in the lead sensors,
   wherein the lead sensors are each configured to determine that the sensed data from a first one of the multiple sensors is different from the sensed data from others of the multiple sensors without decrypting the encrypted data and to transmit the encrypted sensed data determined to be different.

22. The system of claim 21, further comprising a database configured to receive the aggregated data from ones of the lead sensors.

* * * * *